(12) United States Patent
Hu et al.

(10) Patent No.: US 11,984,772 B1
(45) Date of Patent: May 14, 2024

(54) SUPPORT DEVICE AND WORKING MACHINE WITH THE SAME

(71) Applicant: Jinyun Mailin Tools Co., Ltd, Zhejiang (CN)

(72) Inventors: Quanyu Hu, Zhejiang (CN); Huahua Lu, Zhejiang (CN)

(73) Assignee: Jinyun Mailin Tools Co., Ltd, Lishui (CN)

( * ) Notice: Subject to any disclaimer, the term of this patent is extended or adjusted under 35 U.S.C. 154(b) by 0 days.

(21) Appl. No.: 18/233,337

(22) Filed: Aug. 14, 2023

(30) Foreign Application Priority Data

Jul. 6, 2023 (CN) .......................... 202321761796.3

(51) Int. Cl.
*H02K 11/30* (2016.01)
*H02K 5/00* (2006.01)
*H02K 11/25* (2016.01)
*H02K 11/33* (2016.01)

(52) U.S. Cl.
CPC ............... *H02K 11/30* (2016.01); *H02K 5/00* (2013.01)

(58) Field of Classification Search
CPC ........ H02K 11/30; H02K 11/33; H02K 11/25; H02K 5/00

USPC ................................................. 310/50, 68 R
See application file for complete search history.

(56) References Cited

FOREIGN PATENT DOCUMENTS

| CN | 205546643 U | * | 9/2016 | |
|---|---|---|---|---|
| CN | 111564933 A | * | 8/2020 | ........... H02K 11/215 |
| CN | 216392219 U | * | 4/2022 | |

* cited by examiner

*Primary Examiner* — Jose A Gonzalez Quinones

(57) ABSTRACT

The present disclosure discloses a support device and a working machine arranged with the support device. The support device is configured to support an operating machine and includes: a telescopic member retractable in a length direction; an operating section mounting member connected to a first end of the telescopic member; and a power supply control member connected to a second end of the telescopic member, the first end and the second end being opposite to each other along the length direction; wherein the operating section mounting member is arranged with a plug-in interface; the power supply control member is configured to provide a power supply to the plug-in interface; the power supply control member includes a primary controller for controlling conduction of the power supply and a secondary controller for controlling activation of the operating machine.

18 Claims, 17 Drawing Sheets

US 11,984,772 B1

SUPPORT DEVICE AND WORKING MACHINE WITH THE SAME

CROSS REFERENCE

The present disclosure claims priority of Chinese Patent Application No. 202321761796.3, filed on Jul. 6, 2023, the entire contents of which are hereby incorporated by reference in their entirety.

TECHNICAL FIELD

The present disclosure relates to the technical field of high branch pruning, and in particular to a support device and a Working Machine with the support device.

BACKGROUND

In order to prune high branches or twigs in fruit trees or gardens, a high-branch working machine for pruning high branches of different heights has been developed. The high-branch working machine in the related art includes a telescopic pole retractable in a length direction, an operating machine connected to a front end of the telescopic pole, and a grip connected to a rear end of the telescopic pole, and the operating machine is arranged with an actuator. However, an on/off switch of the operating machine is also arranged on the operating machine, and it is inconvenient for a user to turn on/off the operating machine.

Currently, there are telescopic poles for specific high-branch working machine, such as lithium chain saws. However, such telescopic poles can only be matched to specific lithium chain saws, such as lithium chain saws with brushed motors or with brushless motors, and cannot meet the need to match different types of working machines.

Therefore, there is an urgent need to provide a support device that can match a variety of operating machines.

SUMMARY OF THE DISCLOSURE

In one aspect, the present disclosure provides a retractable support device, configured to support an operating machine and including: a telescopic member retractable in a length direction; an operating section mounting member connected to a first end of the telescopic member; and a power supply control member connected to a second end of the telescopic member, the first end and the second end being opposite to each other along the length direction; wherein the operating section mounting member is arranged with a plug-in interface; the power supply control member is configured to provide a power supply to the plug-in interface; the power supply control member includes a primary controller for controlling conduction of the power supply and a secondary controller for controlling activation of the operating machine.

In another aspect, the present disclosure further provides an including an operating machine and the support device according to any one of the above for supporting the operating machine.

BRIEF DESCRIPTION OF THE DRAWINGS

In order to more clearly illustrate the technical solutions in the embodiments of the present disclosure, the following will be a brief introduction to the description of the embodiments of the need to use the accompanying drawings, it is obvious that the following description of the accompanying drawings is only some of the embodiments of the present disclosure. For those skilled in the art, other accompanying drawings may be obtained from these accompanying drawings without creative labor.

DETAILED DESCRIPTION

Figure 1:
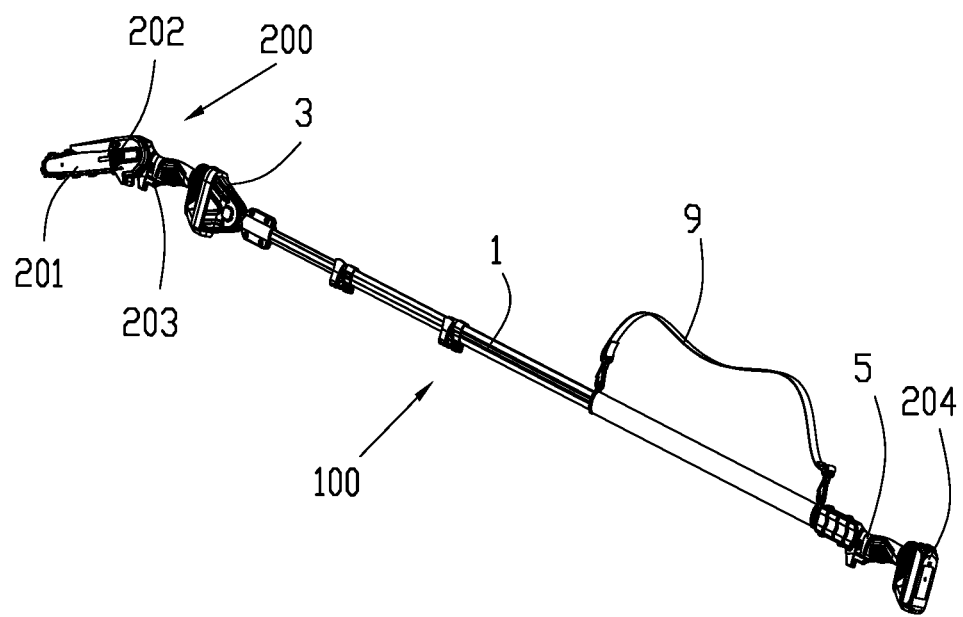
FIG. 1 is a perspective structural schematic view of a working machine according to the present disclosure.

In order to make the objects, technical solutions and advantages of the present disclosure clearer, various embodiments of the present disclosure will be described in detail below in connection with the accompanying drawings. Those skilled in the art can understand that in each embodiment of the present disclosure, many technical details are proposed in order to enable better understanding of the present disclosure. However, even without these technical details and various variations and modifications based on the following various embodiments, the technical solution claimed in the present disclosure can be realized.

A working machine of the present disclosure is an apparatus, where an operating machine 200 is mounted on a retractable support device 100, such that the working machine is retractable for pruning high branches or twigs, etc. The operating machine may be a lawn mower, a plow, lithium scissors, a rotary mop, a lithium chain saw, etc. For example, high-branch chain saws and high-branch scissors are used for pruning high branches of different heights.

In the embodiments, the operating machine 200 includes an operating tool and a power supply 204 for providing power to the operating tool. The operating tool includes an operating section 201, a driver 202 for driving the operating section 201, and a control switch 203 for controlling the driver 202. The control switch 203 is electrically connected to the power supply 204. The operating machine 200 may be a lithium chain saw, lithium scissors, etc., the specific structure of which is prior art and will not be described in detail. The driver 202 may be a brushed motor or a brushless motor, and the brushed motor or the brushless motor is prior art and will not be described in detail herein.

Figure 2:
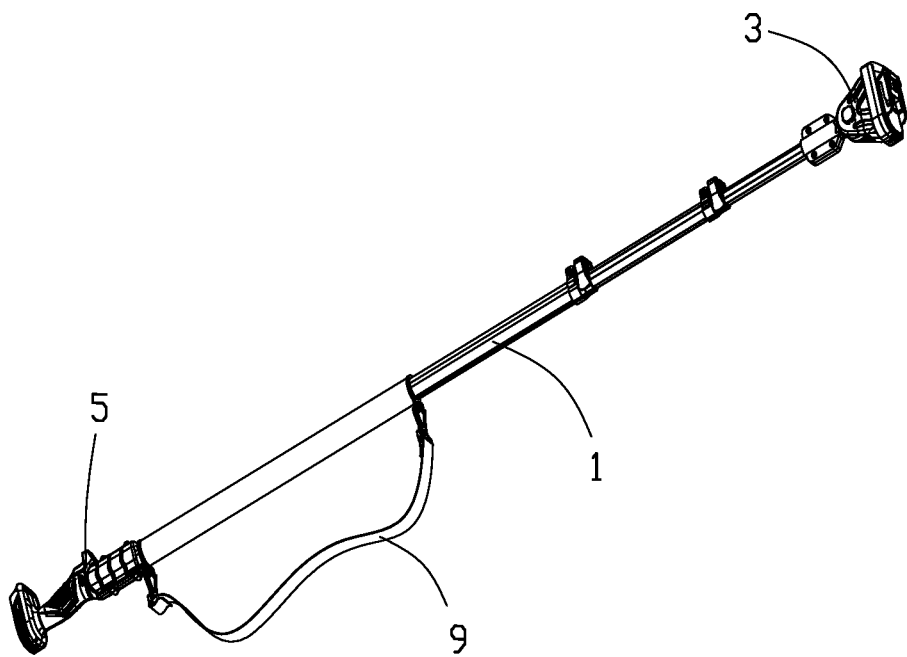
FIG. 2 is a structural schematic view of a support device in the working machine shown in FIG.
Figure 3:
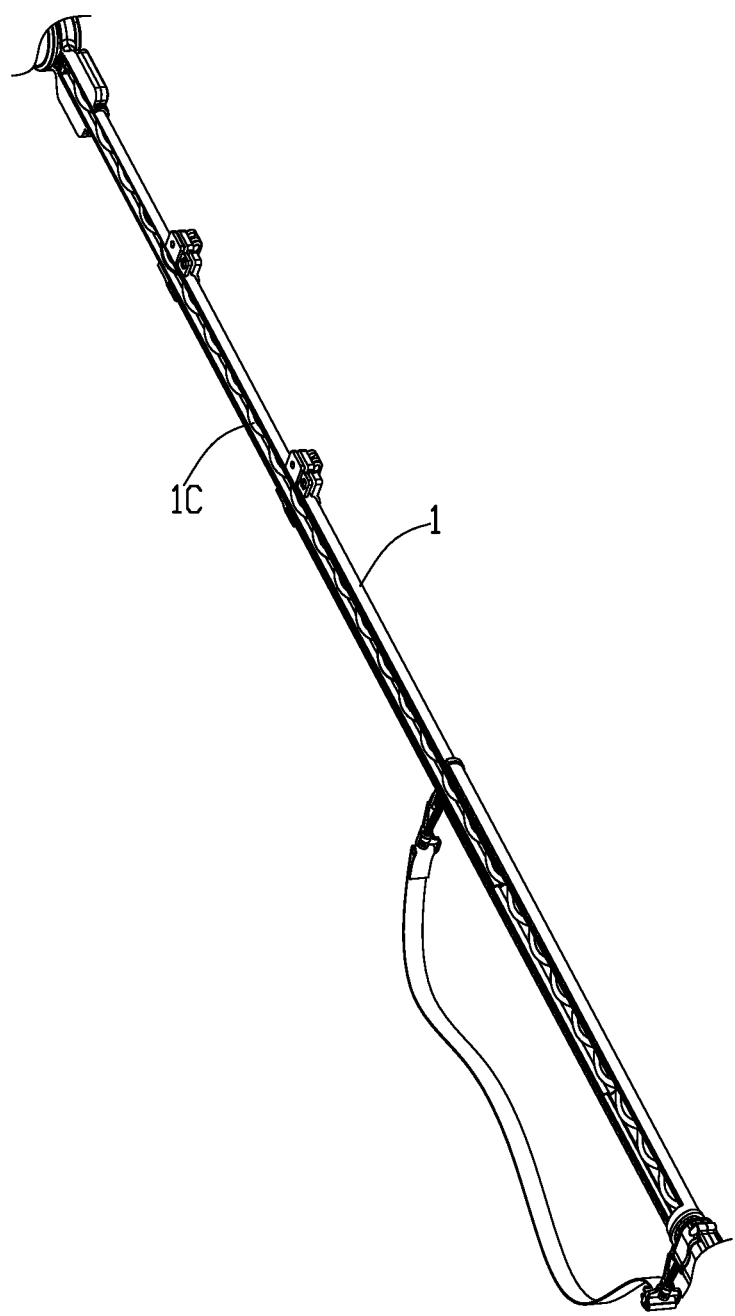
FIG. 3 is a cross-sectional view of a partial structure of a telescopic member shown in FIG. 2.
Figure 4:
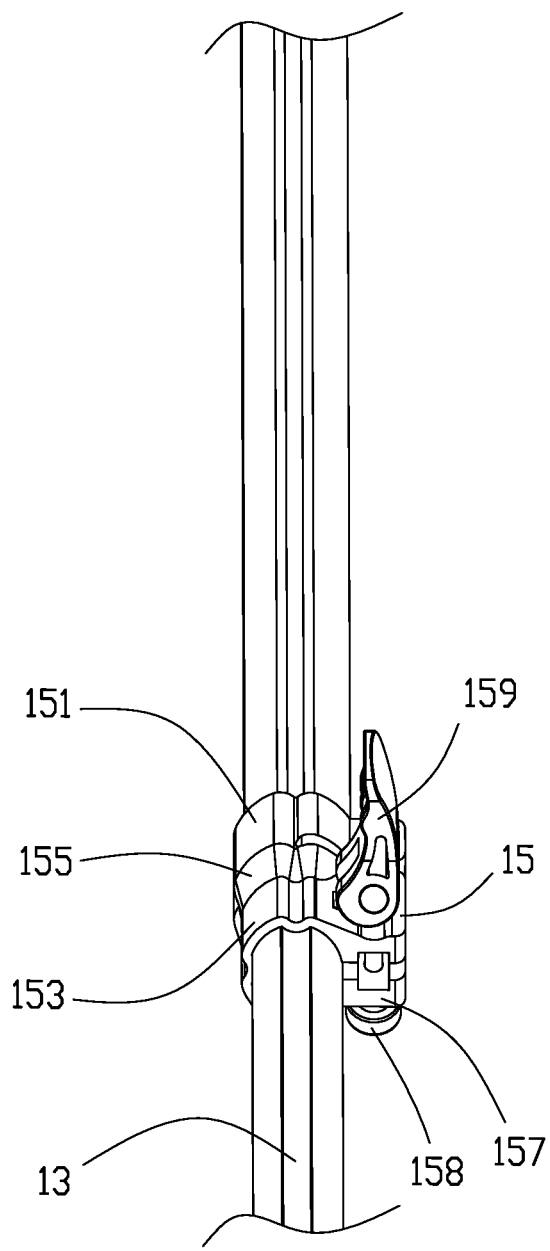
FIG. 4 is a schematic view of a partial structure of a telescopic member shown in FIG. 2.
Figure 5:
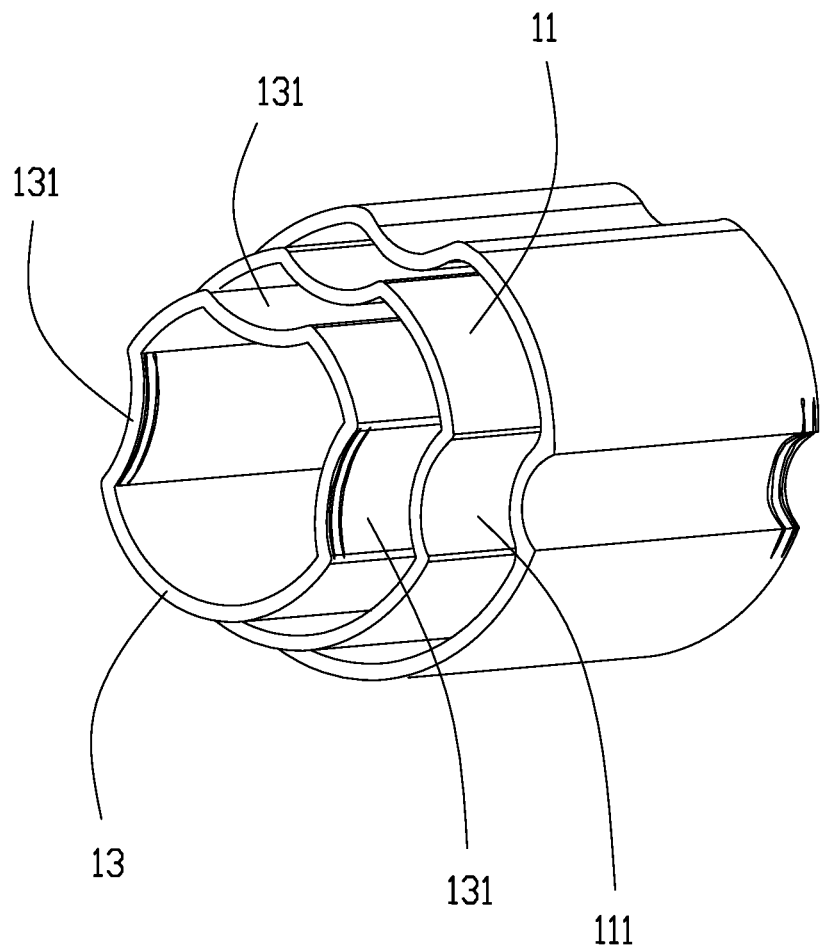
FIG. 5 is a cross-sectional view of a telescopic member.
Figure 6:
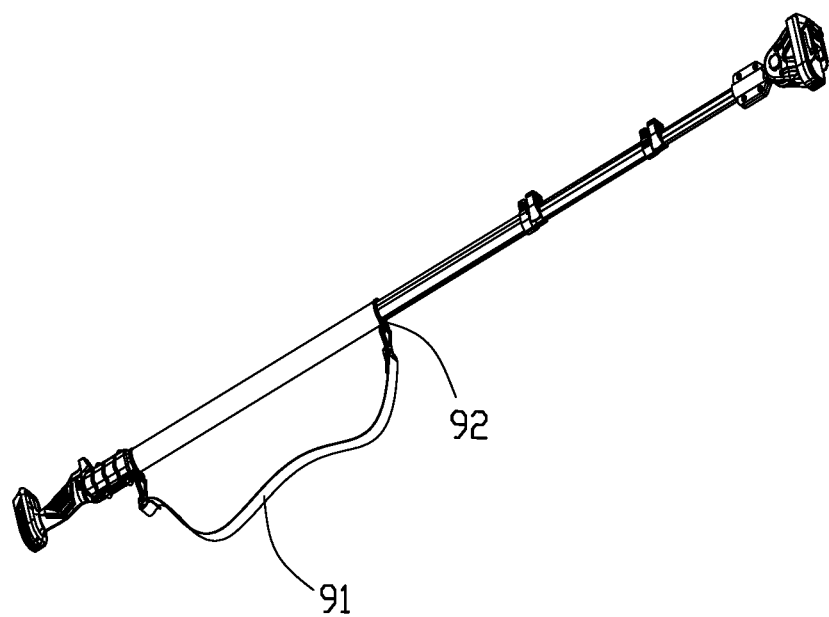
FIG. 6 is a schematic view of a partial structure of the telescopic member shown in FIG. 2.
Figure 7:
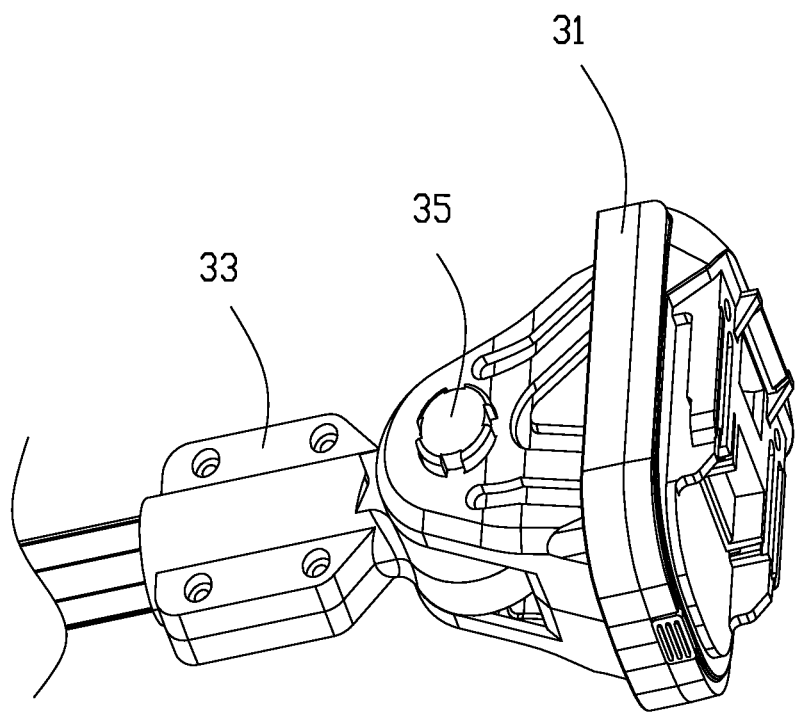
FIG. 7 is a perspective structural schematic view of an operating section mounting member shown in FIG. 2.
Figure 8:
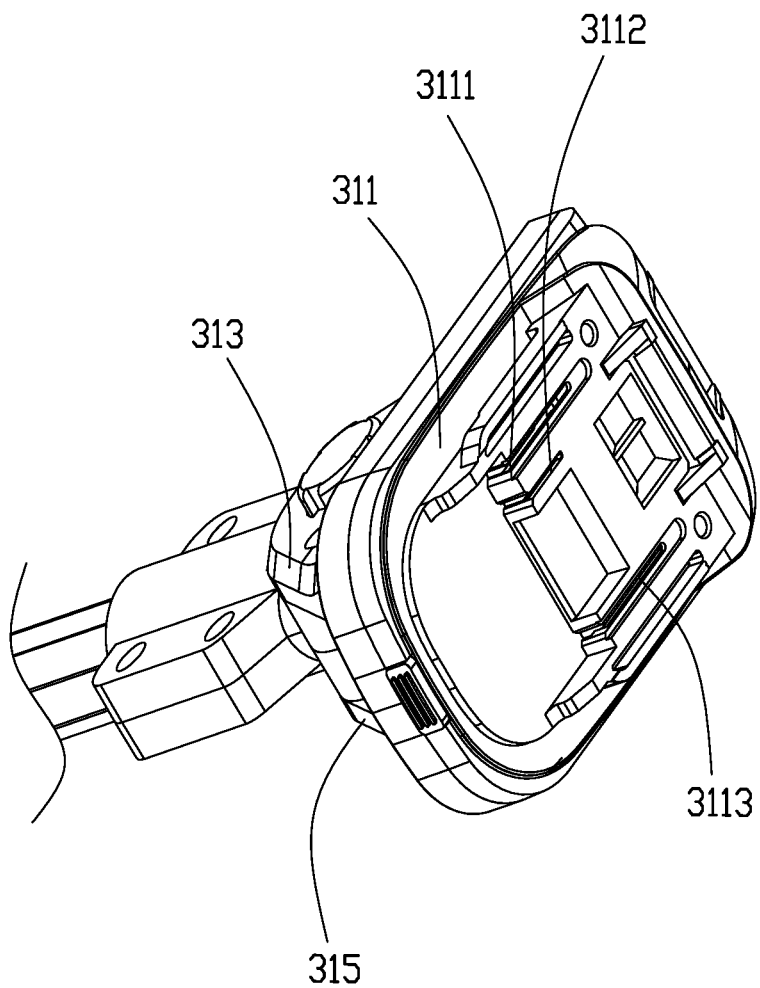
FIG. 8 is a schematic structural view of a seat body in an operating section mounting member shown in FIG. 2.
Figure 9:
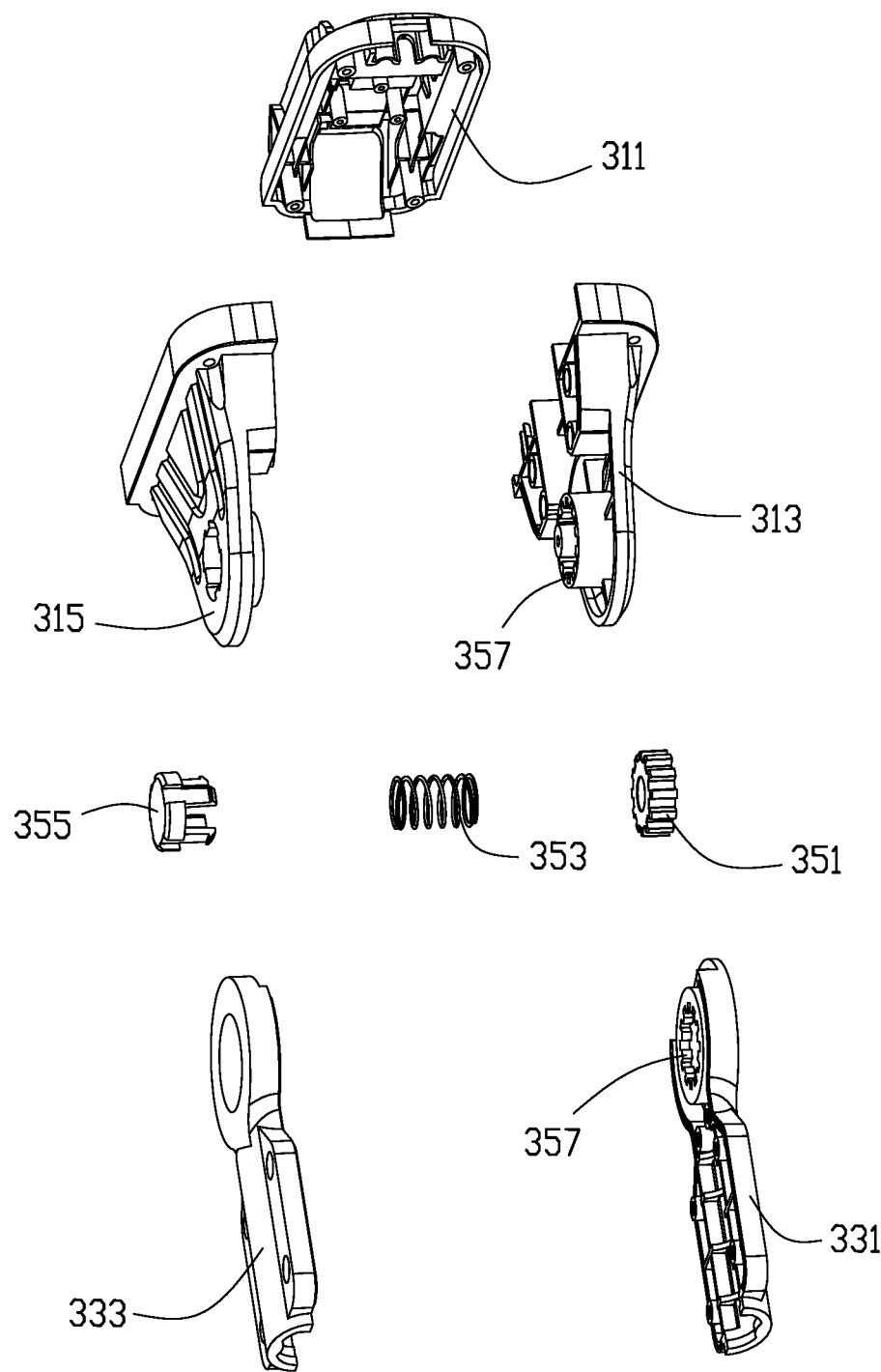
FIG. 9 is an exploded view of the operating section mounting member shown in FIG. 6.
Figure 10:
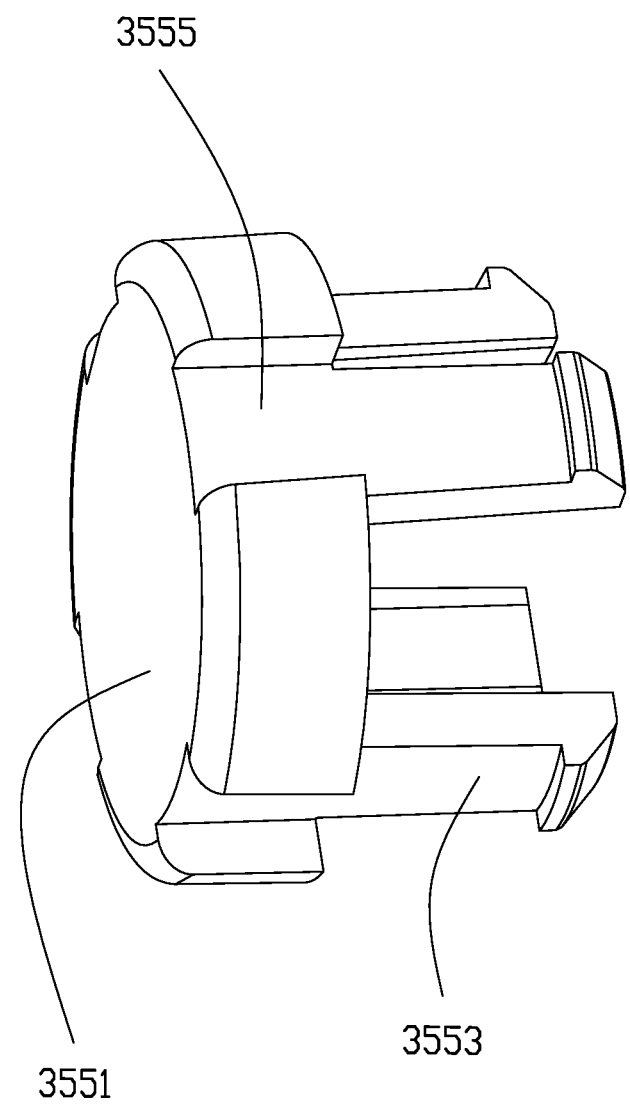
FIG. 10 is a structural schematic view of a positioning member in the operating section mounting member shown in FIG. 8.
Figure 11:
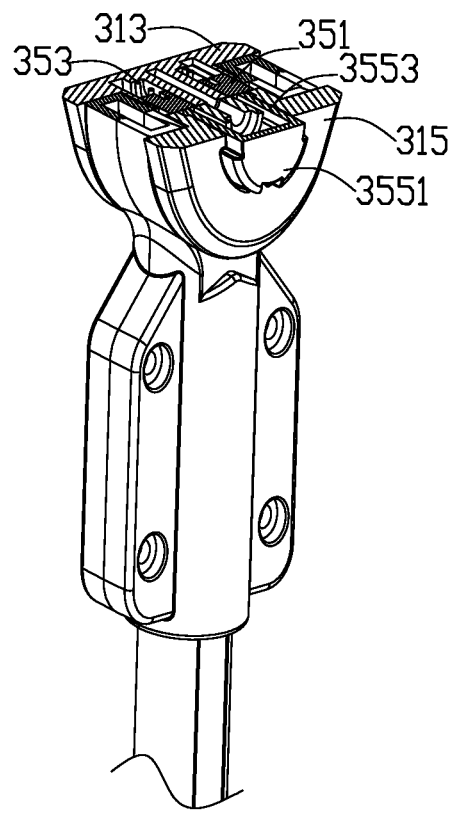
FIG. 11 is a cross-sectional view of the operating section mounting member shown in FIG. 6.
Figure 12:
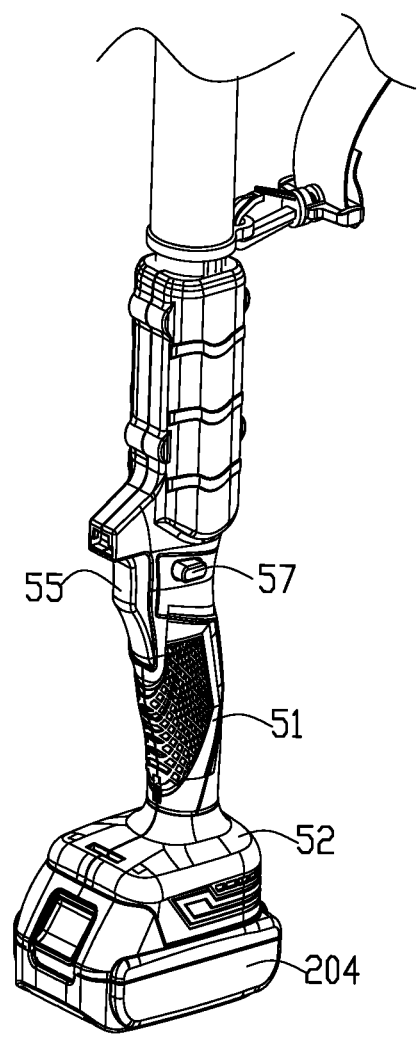
FIG. 12 is a schematic view of a partial structure of a power supply control member shown in FIG. 2.
Figure 13:
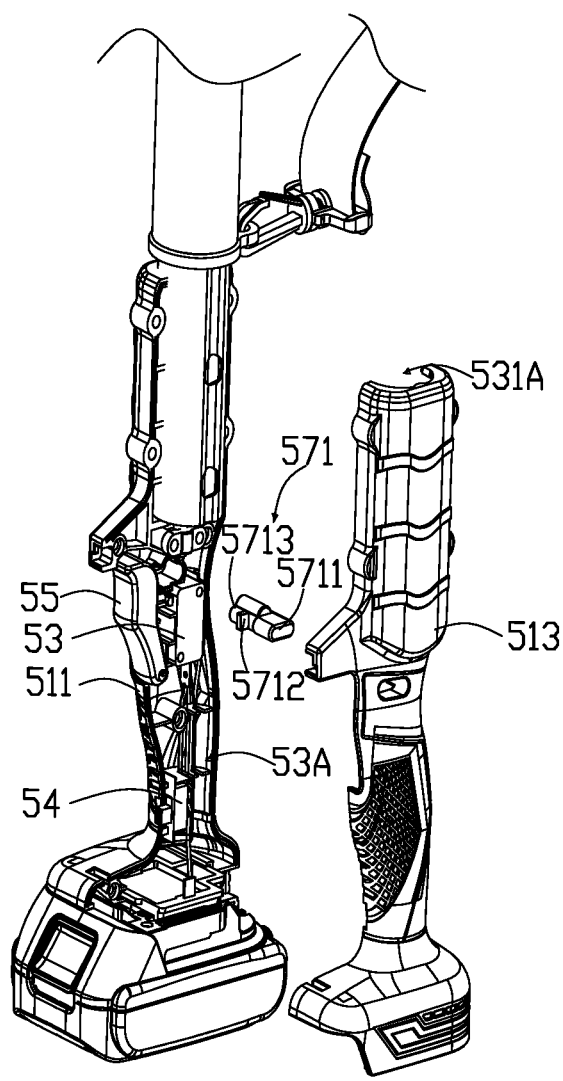
FIG. 13 is an exploded view of the power supply control member shown in FIG. 11.
Figure 14:
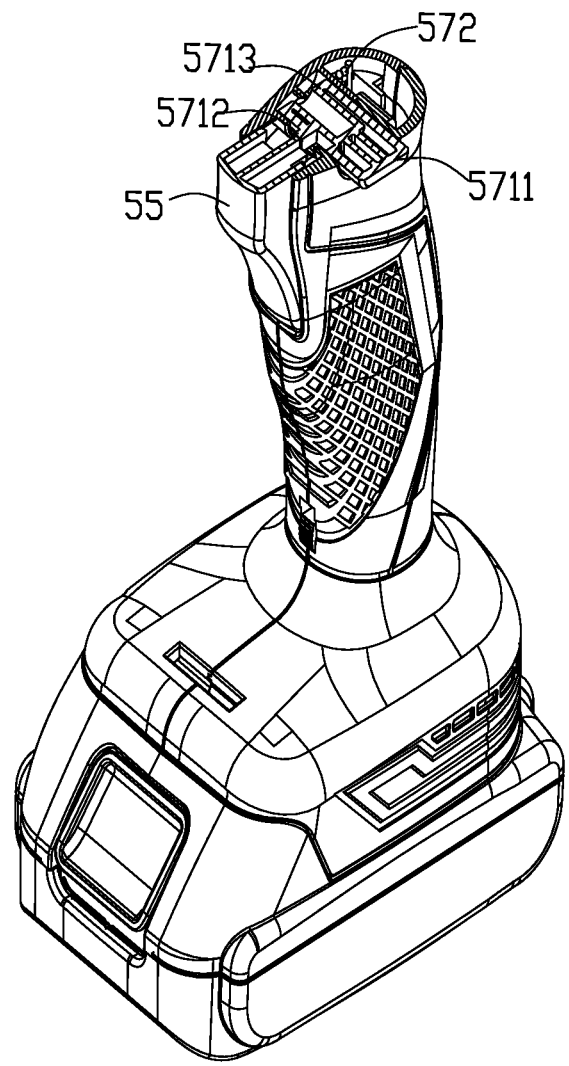
FIG. 14 is a cross-sectional view of the power supply control member shown in FIG. 11.
Figure 15:
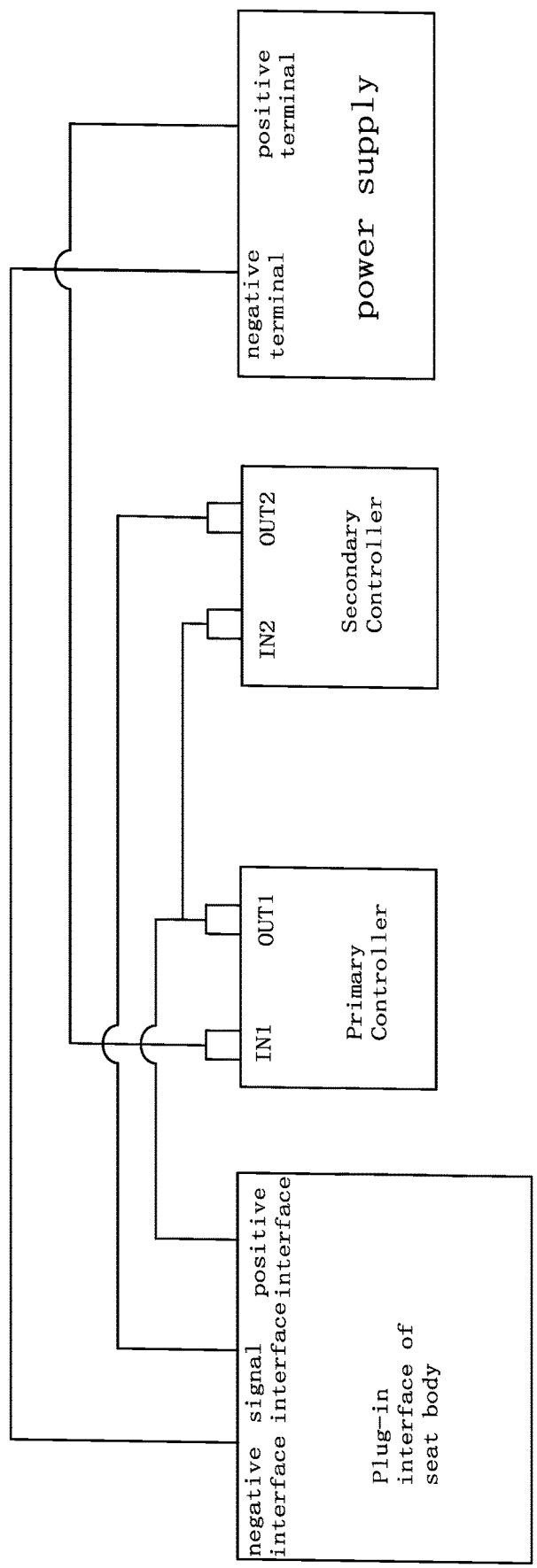
FIG. 15 is a circuitry schematic diagram of a power supply, a primary controller, a secondary controller, and a plug-in interface in a working machine according to the present disclosure.
Figure 16:
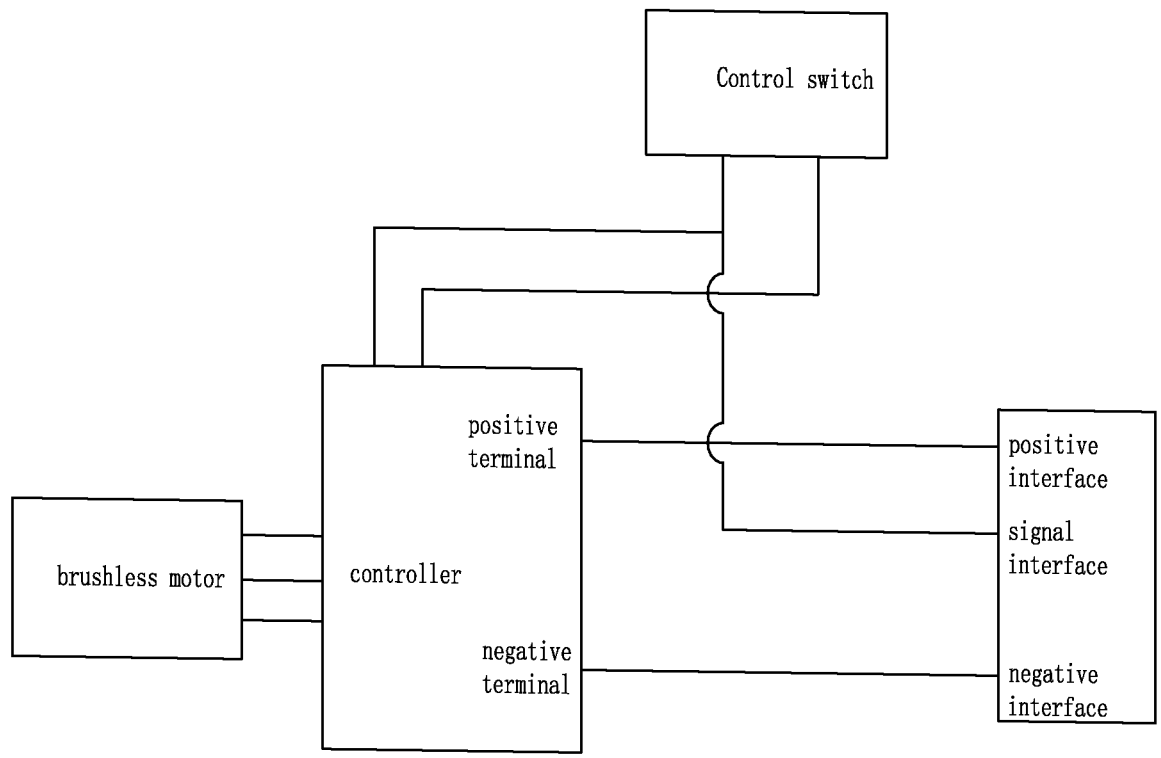
FIG. 16 is a circuitry schematic diagram of a brushless motor in a working machine according to the present disclosure.
Figure 17:
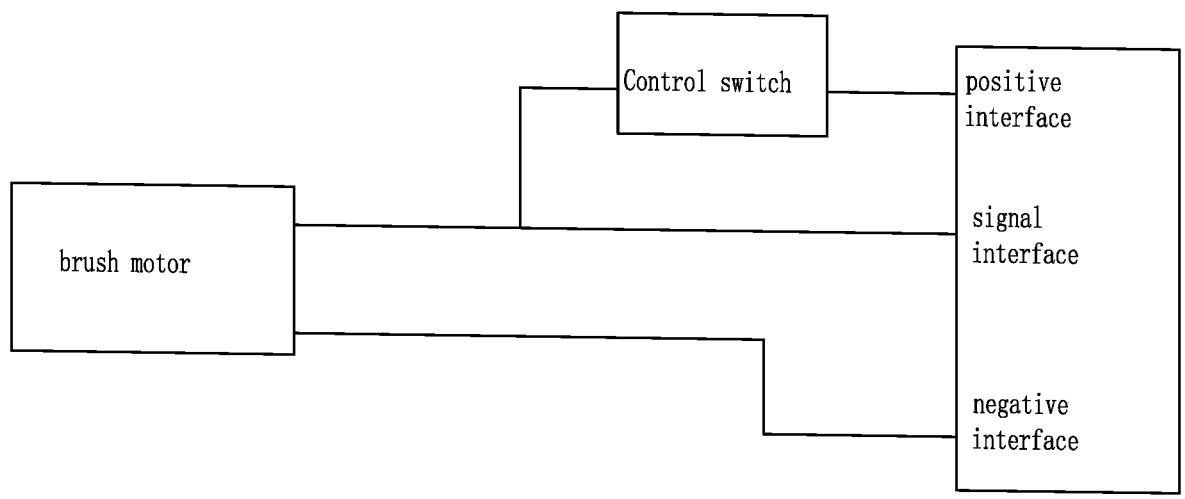
FIG. 17 is a circuitry schematic diagram of a brushless motor in a working machine according to the present disclosure.

Referring to FIGS. 1 to 17, the support device 100 includes a telescopic member 1 retractable in a length direction, an operating section mounting member 3 connected to a first end of the telescopic member 1 for mounting the operating machine 200, and a power supply control member 5 connected to a second end of the telescopic member 1. The power supply control member 5 is configured to provide power to the operating machine 200, such as the power supply. The power supply 204 of the operating machine 200 is detachably mounted on the power supply control member 5, and the operating tool is detachably mounted on the operating section mounting member 3. The first end and the second end are two ends of the telescopic member 1 disposed opposite to each other along the length direction.

In the embodiments, the telescopic member 1 is substantially in the form of a hollow tubular structure. The telescopic member 1 includes a first tube 11, a second tube 13 inserted into the first tube 11, and a clamping device 15 fixed to the first tube 11 and the second tube 13, the clamping device 15 being capable of applying a clamping force to the first tube 11 and the second tube 13 to restrict the telescopic member 1 from extending and contracting along the length direction. It will be appreciated that the telescopic member 1 may be of other construction, such as in the form of a solid rod, etc.

It is noted that the number of tubes of the telescopic member 1 is not limited to two, but may be three, four, five, etc. The multi tubes structure allows an operator to use the telescopic member 1 to stand on the ground when operating at heights within a preset height range, thereby effectively ensuring the safety of the operator when operating at heights. A commonly used telescopic member 1 can be operated at heights ranging from 1.5 meters to less than 4 meters.

As shown in the figures, in some embodiments, the telescopic member 1 is adopted with a three-section tube structure, i.e., any two adjacent tubes of the telescopic member 1 may be regarded as a first tube 11 and a second tube 13.

A first tube 11 defines a first recess 111, which is formed on an outer surface of the first tube 11 and is recessed in a direction toward an inner surface thereof, and the second tube 13 defines a second recess 131, which is formed on an outer surface of the second tube 13 and is recessed in a direction toward an inner surface thereof. A wall of the first recess 111 is inserted into the second recess 131 to restrict relative rotation of the first tube 11 and the second tube 13 along a circumferential direction of the telescopic member 1. The first recess 111 extends from a front end to a rear end of the first tube 11, and the second recess 131 extends from a front end to a rear end of the second tube 13.

It is to be noted that the number of corresponding recesses of the first tube 11 and the second tube 13 is not limited to one, but may be two, three, four, etc., and that the tube with multiple recesses may effectively increase the bending strength of the telescopic member 1 within a longest usage range compared with the tube with a single-recess structure.

In some embodiments, the first tube 11 and the second tube 13 each define three recesses, as shown in the figures.

The clamping device 15 includes a first tube portion 151 sleeved on the first tube 11, a second tube portion 153 sleeved on the second tube 13, a transition tube portion 155 connected to the first tube portion 151 and the second tube portion 153, two fixing portions 157 extending from an outer surface of the first tube portion 151 that are spaced apart, a bolt 158 passing through the two fixing portions 157, and an eccentric cam handle structure 159 rotatably connected to an end of the bolt 158 to drive the two fixing portions 157 to relatively move away from or move toward each other. Specifically, when the eccentric cam handle structure 159 rotates around the bolt 158, a force applied by the eccentric cam handle structure 159 to the fixing portions 157 changes. When the force applied by the eccentric cam handle structure 159 to the fixing portions 157 increases, the two fixing portions 157 move towards each other in opposite directions (i.e., the two fixing portions 157 move close); when the force applied by the eccentric cam handle structure 159 to the fixing portions 157 decreases, the two fixing portions 157 move away from each other in opposite directions (i.e., the two fixing portions 157 move apart). When the eccentric cam handle structure 159 drives the two fixing portions 157 to move away from each other (i.e., when the first tube portion 151 and the second tube portion 153 of the clamping device 15 do not exert a clamping force on the second tube 13 and the first tube 11), a depth of insertion of the second tube 13 into the first tube 11 may be adjusted to adjust the length of the telescopic member 1; and when the eccentric cam handle structure 159 drives the two fixing portions 157 to move toward each other (i.e., when the first tube portion 151 and the second tube portion 153 of the clamping device 15 exert a clamping force on the second tube 13 and the first tube 11), the telescopic member 1 may be restricted from telescoping in the length direction. In this way, the retraction and extension of the telescopic member 1 may be stopped at any length position within a predetermined height range.

In the embodiments, the support device 100 further includes a spiral-shaped wire 1C, configured to be electrically connected to the operating section mounting member 3 and the power supply control member 5. The wire 1C may be arranged in a holding space 1A defined by the first tube 11, the second tube 13, etc. of the telescopic member 1. The wire 1C is spiral-shaped to satisfy the need to follow the telescopic member 1 to elongate or shorten.

In the embodiments, the support device 100 further includes a backstrap assembly 9, the backstrap assembly 9 including a braided strap 91 and fixing members 92 disposed at both ends of the braided strap 91, respectively, for fixing and connecting the braided strap 91 to the telescopic member 1. In the embodiments, the fixing member 92 may be a collar sleeved on the first tube 11.

The operating section mounting member 3 includes a connection seat 31 for mounting the operating tool, a connection member 33 fixed to the first end of the telescopic member 1, and a multi-angle positioning lock 35 that enables the connection seat 31 and the connection member 33 are rotatably connected. The multi-angle positioning lock 35 may enable the connection seat 31 to be rotated multiple stops within a preset rotation angle range at a preset angle of one stop. The structure and function of the multi-angle positioning lock 35 are well known, so a detailed description is omitted.

In some embodiments, the preset rotation angle range is 180 degrees, and the preset angle is 30 degrees in one stop. Therefore, the connection seat 31 may be adjusted in six stops to adjust the angle of the operating tool. The connection seat 31 capable of rotating multiple stops within the preset rotation angle range at the preset angle of one stop can make the working machine adapt to more operating environments.

The connection seat 31 includes a seat body 311 connected to the operating tool, and a first support frame 313 and a second support frame 315 that are connected to a side of the seat body 311 away from the operating tool.

The seat body 311 is arranged with plug-in interfaces, which includes a negative interface 3113, a signal interface 3112, and a positive interface 3111 that are sequentially arranged. The negative interface 3113, the signal interface 3112, and the positive interface 3111 are electrically connected to the power supply control member 5.

The connection member 33 includes a first connection member 331 and a second connection member 333 that are disposed between the first support frame 313 and the second support frame 315. The first connection member 331 is disposed proximate the first support frame 313, and the second connection member 333 is disposed proximate the second support frame 315. Each of the first connection member 331 and the second connection member 333 defines a connection hole, and a fastener is arranged passing through the connection hole to connect the first connection member 331 and the second connection member 333 together, and the fastener passes through the first end of the telescopic member 1 in order to enable the connection member 33 to be connected to the telescopic member 1.

The connection member 33 is rotatably connected to the first support frame 313 and the second support frame 315 by means of the multi-angle positioning lock 35.

The multi-angle positioning lock 35 includes a hollow positioning gear 351, a positioning spring 353, and a positioning member 355 including a base 3551 and multiple inverted fasteners 3553 extending from the base 3551. The base 3551 is substantially circular in shape, and the multiple inverted fasteners 3553 are spaced apart around a circumference of the base 3551. Each of the first connection member 331 and the first support frame 313 defines grooves 357 for insertion of convex teeth of the positioning gear 351, and the second support frame 315 defines a housing hole 3151 for insertion of the base 3551.

When assembled, the positioning member 355 is inserted into the second connection member 333 through the housing holes 3151, the positioning gear 351 is fixed to the grooves 357 of the first connection member 331 and the first support frame 313, and the inverted fasteners 3553 of the positioning member 355 abut against the positioning gear 351. The positioning spring 353 abuts between the positioning member 355 and the first support frame 313 and against the positioning gear 351. When the positioning member 355 is pressed, the positioning gear 351 is pushed to move from the grooves 357 of the first connection member 331 to the grooves 357 of the first support member 315, and the positioning spring 353 is pushed to be compressed inside the first connection member 331, in which case the positioning gear 351 is disengaged from the first connection member 331, and the connection seat 31 is rotatable relative to the connection member 33. When the connection seat 31 is adjusted to a desired position, the positioning member 355 is loosened, and the positioning spring 353 rebounds and pushes the positioning gear 351 back to an initial position, thereby fixing the connection member 33 with the connection seat 31.

In some embodiments, the operating tool is detachably connected to the connection seat 31.

The power supply control member 5 includes a grip 51 for holding and a power supply mount 52 connected to the grip 51. The power supply 204 is arranged in the power supply mount 52. The power supply 204 has a positive terminal and a negative terminal.

The power supply control member 5 further includes a primary controller 53 and a secondary controller 54. In some embodiments, the primary controller 53 is a primary control switch and the secondary controller 54 is a secondary control switch. The primary controller 53 includes a first input IN1 and a first output OUT1, and the secondary controller 54 includes a second input IN2 and a signal output OUT2. The signal output OUT2 is configured to output a control signal for controlling the driver 202 of the operating tool to turn on or shut down.

In the embodiments, the negative interface 3113 of the connection seat 31 is electrically connected to the negative terminal of the power supply 204 through the wire 1C; the positive terminal of the power supply 204 is electrically connected to the first input IN1 of the primary controller 53 through the wire, the first output OUT1 is electrically connected to the second input IN2 of the secondary controller 54 through the wire, and the signal output OUT2 is electrically connected to the signal interface 3112 through the wire; in addition, the first output OUT1 is electrically connected to the positive interface 3111 through the wire. The above arrangement makes both the electrical signal and the control signal at the grip to be conducted to the plug-in interface of the connection seat 31, and such that the connection seat 31 is conducted with the operating tool when the operating tool is mounted on the seat body.

The grip 51 includes a left handle body 511 and a right handle body 513, and the left handle body 511 and the right handle body 513 are assembled to enclose and define a holding cavity 53A having a first opening 531A at an end. A rear end of the telescopic member 1 is inserted into the holding cavity 53A from the first opening 531A and is fixedly connected to the left handle body 511 and the right handle body 513. The primary controller 53 and the secondary controller 54 are received in the handle bodies 511 and 513 and connected to the handle bodies 511 and 513 by through the wire. As shown in the figures, each of the left handle body 511 and the right handle body 513 defines a fixing hole for fixing a bolt, and the bolt passes through the telescopic member 1.

The power supply control member 5 further includes a trigger switch 55 and a switch lock 57. The trigger switch 55 is arranged on the grip 51 and is exposed on the right handle body 513. The trigger switch 55 is electrically connected to the primary controller 53. The trigger switch 55 includes a pressing portion 571 and a pressing spring 572 abutting against the pressing portion 571. The pressing portion 571 includes a pressing end 5711 exposed to the grip 51, an abutting end 5712 abutting against the trigger switch 55, and a mounting end 5713 arranged on the left handle body 511.

During operation, when the pressing end 5711 is pressed, the pressing spring 572 and the abutting end 5712 move together in a direction away from the left handle body 511, the abutting end 5712 is disengaged from the trigger switch 55, and the trigger switch 55 is pressed to turn on the primary controller 53.

In this way, switching between a locked state and an unlocked state of the primary controller 53 by arranging the switch lock 55 may prevent accidental touching and activating of the operating machine 200.

When the operating machine 200 is assembled with the support device 100, it operates as follows.

When the driver is a brushed motor, the primary controller 53 is turned on and the secondary controller 54 is turned on, a positive terminal of the driver 202 is electrically connected to the positive interface 3111 through the control switch 203, and the positive terminal of the driver 202 is also electrically connected to the signal interface 3112, and a negative terminal of the driver 202 is electrically connected to the negative interface 3113.

When the driver is a brushless motor, the primary controller 53 is turned on and the secondary controller 54 is turned on, and the operating machine further includes a controller electrically connected to the driver 202. A positive terminal of the controller is electrically connected to the positive interface 3111, and a negative terminal of the controller is electrically connected to the negative interface 3113; the controller is also electrically connected to the signal interface 3112 through the control switch 203.

Those skill in the art can understand that each of the above embodiments is a specific embodiment for realizing the present disclosure, and that in actual application, various changes can be made thereto in form and detail without deviating from the spirit and scope of the present disclosure.

What is claimed is:

1. A retractable support device, configured to support an operating machine and comprising:
   a telescopic member retractable in a length direction;
   an operating section mounting member connected to a first end of the telescopic member and the operating machine; wherein the operating section mounting member is disposed between the operating machine and the first end, the operating machine is connected to the first end of the telescopic member through the operating section mounting member; and
   a power supply control member connected to a second end of the telescopic member, the first end and the second end being opposite to each other along the length direction;
   wherein the operating section mounting member is arranged with a plug-in interface; the power supply control member is configured to provide a power supply to the plug-in interface;
   the power supply control member comprises a primary controller for controlling conduction of the power supply and a secondary controller for controlling activation of the operating machine;
   wherein the plug-in interface comprises a positive interface electrically connected to the primary controller, a negative interface electrically connected to the power supply, and a signal interface electrically connected to the secondary controller;
   the operating machine is electrically connected to the positive interface, the negative interface, and the signal interface.

2. The retractable support device according to claim 1, further comprising a wire electrically connected to the operating section mounting member and the power supply control member; wherein the telescopic member defines a holding space, and the wire is received in the holding space.

3. The retractable support device according to claim 1, wherein the power supply has a positive terminal and a negative terminal; the primary controller comprises a first input and a first output, and the secondary controller comprises a second input and a signal output;
   the positive terminal of the power supply is electrically connected to the first input of the primary controller, the negative terminal of the power supply is electrically connected to the negative interface of the plug-in interface, and the first output of the primary controller is electrically connected to the positive interface and electrically connected to the second input of the secondary controller;
   the signal output is electrically connected to the signal interface.

4. The retractable support device according to claim 1, wherein the telescopic member comprises a first tube, a second tube inserted into the first tube, and a clamping device fixed to the first tube and the second tube; the clamping device is configured to apply a clamping force to the first tube and the second tube to restrict the telescopic member from extending and contracting along the length direction.

5. The retractable support device according to claim 4, wherein an outer surface of the first tube is recessed in a direction toward an inner surface of the first tube to define a first recess, and an outer surface of the second tube is recessed in a direction toward an inner surface of the second tube to define a second recess; a wall of the first recess is inserted into the second recess to restrict relative rotation of the first tube and the second tube along a circumferential direction of the telescopic member.

6. The retractable support device according to claim 1, wherein the power supply control member comprises a grip and a power supply mount connected to the grip, the grip comprising a handle body connected to the telescopic member, and the primary controller and the secondary controller being arranged on the handle body.

7. The retractable support device according to claim 6, wherein the grip further comprises a trigger switch and a switch lock matched with the trigger switch; the trigger switch is electrically connected to the primary controller; in a non-operation state, the switch lock abuts against the trigger switch to prevent inadvertent contact.

8. The retractable support device according to claim 1, wherein the operating section mounting member comprises a connection seat detachably connected to the operating machine, a connection member fixed to the telescopic member, and a multi-angle positioning lock connected to the connection seat and the connection member; the multi-angle positioning lock is configured to cause the connection seat to be rotated a plurality of stops within a preset rotation angle range at a preset angle of one stop.

9. The retractable support device according to claim 8, wherein the plug-in interface is arranged on the connection seat.

10. A working machine, comprising an operating machine and a support device for supporting the operating machine; wherein the support device comprises:
   a telescopic member retractable in a length direction;
   an operating section mounting member connected to a first end of the telescopic member and the operating machine; wherein the operating section mounting member is disposed between the operating machine and the first end, the operating machine is connected to the first end of the telescopic member through the operating section mounting member; and
   a power supply control member connected to a second end of the telescopic member, the first end and the second end being opposite to each other along the length direction;
   wherein the operating section mounting member is arranged with a plug-in interface; the power supply control member is configured to provide a power supply to the plug-in interface; the power supply control member comprises a primary controller for controlling conduction of the power supply and a secondary controller for controlling activation of the operating machine;

wherein the operating section mounting member comprises a connection seat detachably connected to the operating machine, a connection member fixed to the telescopic member, and a multi-angle positioning lock connected to the connection seat and the connection member; the multi-angle positioning lock is configured to cause the connection seat to be rotated a plurality of stops within a preset rotation angle range at a preset angle of one stop.

11. The retractable support device according to claim 10, wherein the plug-in interface comprises a positive interface electrically connected to the primary controller, a negative interface electrically connected to the power supply, and a signal interface electrically connected to the secondary controller;

the operating machine is electrically connected to the positive interface, the negative interface, and the signal interface.

12. The working machine according to claim 11, wherein the operating machine comprises an operating section, a driver for driving the operating section to operate, and a control switch for controlling turning-on or turning-off of the driver; the driver is electrically connected to the plug-in interface;

the driver is a brushed motor or a brushless motor.

13. The working machine according to claim 12, wherein the driver is the brushed motor, a positive terminal of the driver is electrically connected to the positive interface through the control switch, and the positive terminal of the driver is also electrically connected to the signal interface 3112, and a negative terminal of the driver is electrically connected to the negative interface.

14. The working machine according to claim 12, wherein the driver is the brushless motor, the operating machine further comprises a controller electrically connected to the driver; a positive terminal of the controller is electrically connected to the positive interface, and a negative terminal of the controller is electrically connected to the negative interface; the controller is also electrically connected to the signal interface through the control switch.

15. The working machine according to claim 10, wherein the support device further comprises a wire electrically connected to the operating section mounting member and the power supply control member; wherein the telescopic member defines a holding space, and the wire is received in the holding space.

16. The working machine according to claim 10, wherein the telescopic member comprises a first tube, a second tube inserted into the first tube, and a clamping device fixed to the first tube and the second tube; the clamping device is configured to apply a clamping force to the first tube and the second tube to restrict the telescopic member from extending and contracting along the length direction.

17. The working machine according to claim 16, wherein an outer surface of the first tube is recessed in a direction toward an inner surface of the first tube to define a first recess, and an outer surface of the second tube is recessed in a direction toward an inner surface of the second tube to define a second recess; a wall of the first recess is inserted into the second recess to restrict relative rotation of the first tube and the second tube along a circumferential direction of the telescopic member.

18. The working machine according to claim 10, wherein the power supply control member comprises a grip and a power supply mount connected to the grip, the grip comprising a handle body connected to the telescopic member, and the primary controller and the secondary controller being arranged on the handle body.

* * * * *